US007527074B1

(12) United States Patent
Gray, Jr.

(10) Patent No.: US 7,527,074 B1
(45) Date of Patent: May 5, 2009

(54) HYDRAULIC PRESSURE ACCUMULATOR

(75) Inventor: Charles L. Gray, Jr., Pinckney, MI (US)

(73) Assignee: The United States of America, as represented by the Administrator of the United States Enviromental Protection Agency, Washington, DC (US)

(*) Notice: Subject to any disclaimer, the term of this patent is extended or adjusted under 35 U.S.C. 154(b) by 0 days.

(21) Appl. No.: 11/974,559

(22) Filed: Oct. 15, 2007

(51) Int. Cl.
*F16L 55/04* (2006.01)

(52) U.S. Cl. ..................... 138/30; 138/26

(58) Field of Classification Search ................ 138/26, 138/27, 30, 31, 32; 116/227, 228
See application file for complete search history.

(56) References Cited

U.S. PATENT DOCUMENTS

| | | | | | |
|---|---|---|---|---|---|
| 4,014,213 | A * | 3/1977 | Parquet | .................... | 73/290 R |
| 4,088,154 | A * | 5/1978 | Patton et al. | .................. | 138/30 |
| 4,428,401 | A * | 1/1984 | Chun | .......................... | 138/30 |
| 4,611,634 | A * | 9/1986 | Kruckewitt et al. | ........... | 138/31 |
| 4,714,093 | A * | 12/1987 | Kawano | ...................... | 138/30 |
| 4,784,182 | A * | 11/1988 | Sugimura | .................... | 138/30 |
| 5,117,873 | A * | 6/1992 | Miyakawa et al. | ............ | 138/30 |
| 5,887,616 | A * | 3/1999 | Ikeda et al. | ................ | 137/558 |
| 6,016,841 | A * | 1/2000 | Larsen | ........................ | 138/30 |
| 2003/0111124 | A1* | 6/2003 | Gray, Jr. | ...................... | 138/30 |

* cited by examiner

*Primary Examiner*—Patrick F Brinson
(74) *Attorney, Agent, or Firm*—David Read

(57) ABSTRACT

A bladder for a high pressure accumulator includes a metal foil layer adhered to the inside of a rubber bladder with a paint-on adhesive. A position contactor switch is further provided to signal position of the bladder within the accumulator and thereby prevent an undesired shut-off.

2 Claims, 3 Drawing Sheets

HYDRAULIC PRESSURE ACCUMULATOR

FIELD OF THE INVENTION

This invention relates to hydraulic accumulators of the bladder type.

DESCRIPTION OF THE RELATED ART

The inventor's prior U.S. Pat. No. 7,121,304, which is incorporated herein by reference, discloses a low permeation bladder accumulator utilizing a metal foil bladder coated with protective polymer. For application of such accumulators as energy storage devices in hydraulic hybrid motor vehicles, it is desired that the accumulators be able to last millions of charging and discharging cycles without need for repair. It is therefore desirable to provide structural improvements to obtain good durability and reliability of such accumulators. It is also desirable to provide for easy assembly of such devices.

U.S. Pat. No. 5,054,373 to Brault discloses a pressure vessel utilizing a diaphragm type flexible separator comprising an impermeable metal film sandwiched between two protective films that is purportedly durable through repetitive cycles of deformation. Brault further discloses a manufacturing method comprising separate fabrication of each flat layer, successively nesting the preformed layers inside each other in a vacuum to prevent air pockets forming between the layers, and then adhesively bonding the layers together in a press to form the diaphragm type separator. The Brault method's use of a press to bond the metal film layer to the protective layers is not viewed as a method for manufacturing or assembling that would be simple or practical when applied to a more three-dimensional or "bag-shaped" accumulator bladder which comprises a metal foil layer and a protective layer.

As used herein, a bladder refers to a balloon-shaped, cylindrical-shaped or bag-shaped separator that fills or compresses with pressure changes between the inside and outside of the bladder, and is generally anchored to a vessel wall at a neck/port at one end of the bladder. In contrast, a diaphragm separator is generally circular or dome-shaped, and anchored at its periphery to the vessel, and flexes somewhat up into one chamber or down into another chamber depending on differences in pressure.

SUMMARY OF THE INVENTION

One object of the present invention is to provide an accumulator bladder with extremely low permeation of gas at high pressures.

Another object of the present invention is to provide an easy method for manufacturing and assembly of such low permeation accumulator bladders.

Another object of the invention is to provide a bladder position sensor to help avoid an undesired accumulator shut-off in such accumulators.

DETAILED DESCRIPTION OF THE INVENTION

Figure 1:
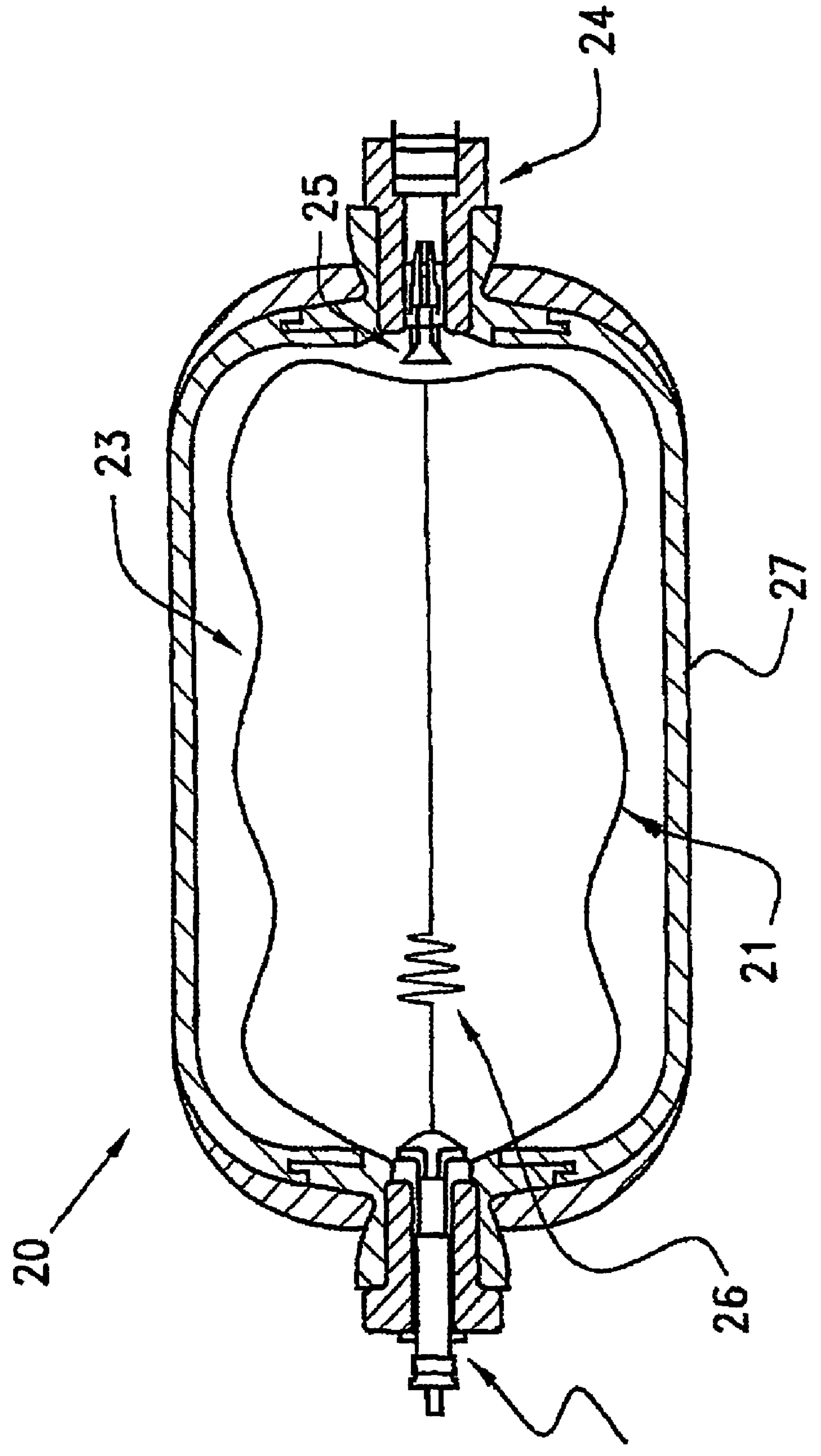
FIG. 1 shows a cross-sectional view of an accumulator according to a preferred embodiment of the invention.

With reference to FIG. 1, a hydraulic accumulator 20 according to a preferred embodiment of the invention is presented. A flexible non-gas-permeable bladder 21 contains compressed gas. Bladder 21 is net-shaped, such that its outside surface conforms to the inside surface of housing 27 when the bladder is filled, without stretching. Gas is charged into bladder 21 through bladder fixture 22. Hydraulic fluid is contained in space 23, between rigid housing 27 and bladder 21, and enters and exits accumulator 20 in the conventional manner through fixture 24. An anti-extrusion valve 25 prevents the bladder 21 from being extruded through fixture 24 as the liquid volume reaches a pre-determined low level (e.g., approaching zero). Retention spring 26 deforms the bladder 21 to provide a space (clearance) around anti-extrusion valve 25; as liquid is discharged, spring 26 prevents the bladder from contacting the anti-extrusion valve 25 until the liquid volume reaches the pre-determined low level. The anti-extrusion valve 25 is contacted as spring 26 expands when the liquid volume approaches zero to shut off valve 25 to prevent extrusion of bladder 21. The interior volume of bladder 21 preferably contains a complete filling of flexible (elastomeric) open-cell foam to minimize heat losses in operation and to help avoid sharp bends in the surfaces of bladder 21.

Figure 2:
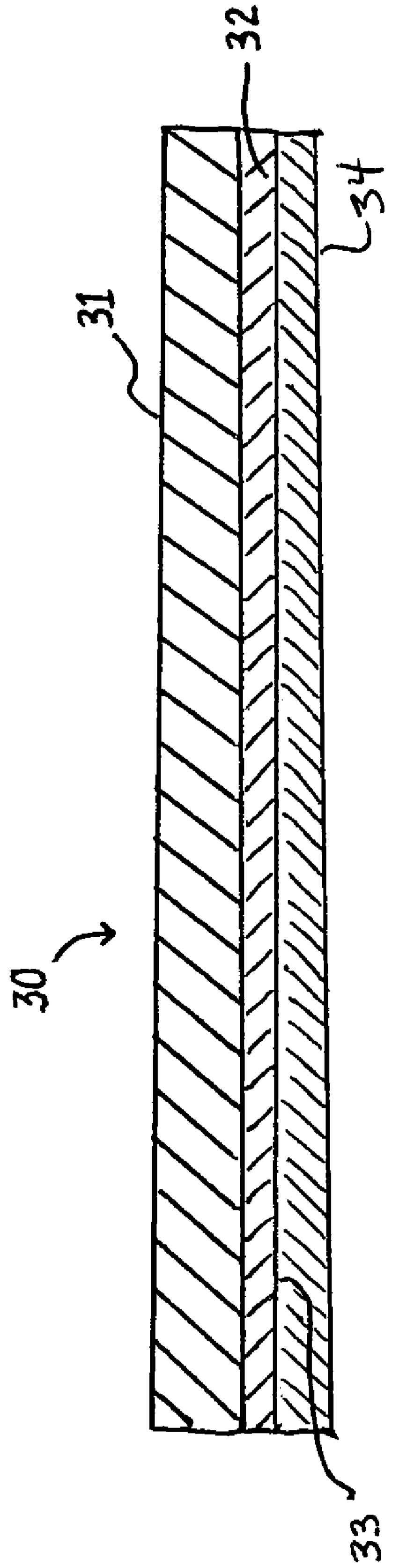
FIG. 2 shows a cross-sectional view of a wall of a bladder according to a preferred embodiment of the invention.

The preferred structure, and materials for bladder 21 will now be described. Bladder wall 30 of bladder 21 is preferably made with more than one layer as represented in FIG. 2. The outer layer 31 comprises a net-shaped bladder made of rubber (e.g., nitrile or hydrin) or other flexible material. To the interior of the bladder is a thin metal foil 32 (e.g., a white PET/Foil), with the foil 32 no more than about 0.001 inch thick, that is adhesively bonded to the layer 31. Alternatively, foil 32 could be D-Con foil, which is a little thicker and has (like PET) polymer coatings. The metal foil 32 used should be durable enough to not wear through or tear over millions of cycles of flexing.

The foil surface 33 that is closest to the gas and foam within the bladder 21 may be either non-coated and exposed to gas in the accumulator or may be covered or coated with a protective laminate layer 34 that is breathable (i.e. readily permeable to gas) to avoid welting and tearing of the foil 32. In other words, if a low permeation coating or laminate were placed on the interior of the foil instead of a breathable layer, some gas that inevitably passed anyway through layer 34 to the surface 33 of metal foil layer 32 would be trapped between layers 32 and 34, and as the gas is cycled between high and low pressures (e.g. 5000 psi to 2000 psi) the gas compresses and expands accordingly. This would result in the permeated gas creating a bubble in that space that can grow and tear the foil 32 and thus cause gas permeation through the layers 32 and 31 of the bladder wall 30 as well (i.e., thereby resulting in a loss of gas-impermeability of bladder 21).

A method for assembling the accumulator 20 of the first embodiment of the present invention will now be set forth. In a first step, a metal foil or foil laminate bag utilizing at least metal foil layer 32 is pre-fabricated. The foil bag is preferably slightly oversized with relation to the interior volume of accumulator 20 such that the bag does not need to stretch to fill the interior volume of the accumulator. The foil bag is then inserted through fixture 22 into bladder 21, which may be comprised of only layer 31. An adhesive may be applied to the interior of bladder layer 31 to reduce relative motion and wear between the two bags.

An alternative and preferred method of assembling the accumulator 20 involves fabricating the bladder wall layer 31 in two or more parts to allow open access to the interior of the bladder. An adhesive is applied to the interior of bladder layer 31. Foil layer 32, optionally pre-bonded with a layer 34, is then applied to the interior of bladder layer 31 in the form of sheets dr strips. To cover the inside of the spherical/dome ends of bladder wall layer 31, overlapping triangular strips are preferably used. The bladder parts (e.g. the sleeve and two end domes) are then spliced together. At connection points (e.g., where an end dome and cylindrical portion join), the foil may be overlapped and then bonded (e.g. by means of a resistively heated band applied around the connections for a determined period of time).

For the adhesive in either of the two methods of assembly described above, paint-on or spray-on contact adhesives may be used. Preferably, a non-aerosol adhesive is applied (e.g., using a paint brush) to decrease the possibility of aeration/bubbles. As one example, a preferred commercially available paint-on adhesive Scotch-Grip #847L Nitrile-Rubber-based Rubber & Gasket Adhesive provides good adhesion between PET/foil and nitrile rubber. As a second example, commercially available Scotch-Weld #10 Neoprene-based contact adhesive provides adequate adhesion between D-Con foil and nitrile rubber. Applicant has found that other methods of applying foil (e.g., plating or vapor deposition) besides gluing have not been practical or effective in forming a durable gas-impermeable bladder.

Figure 3:
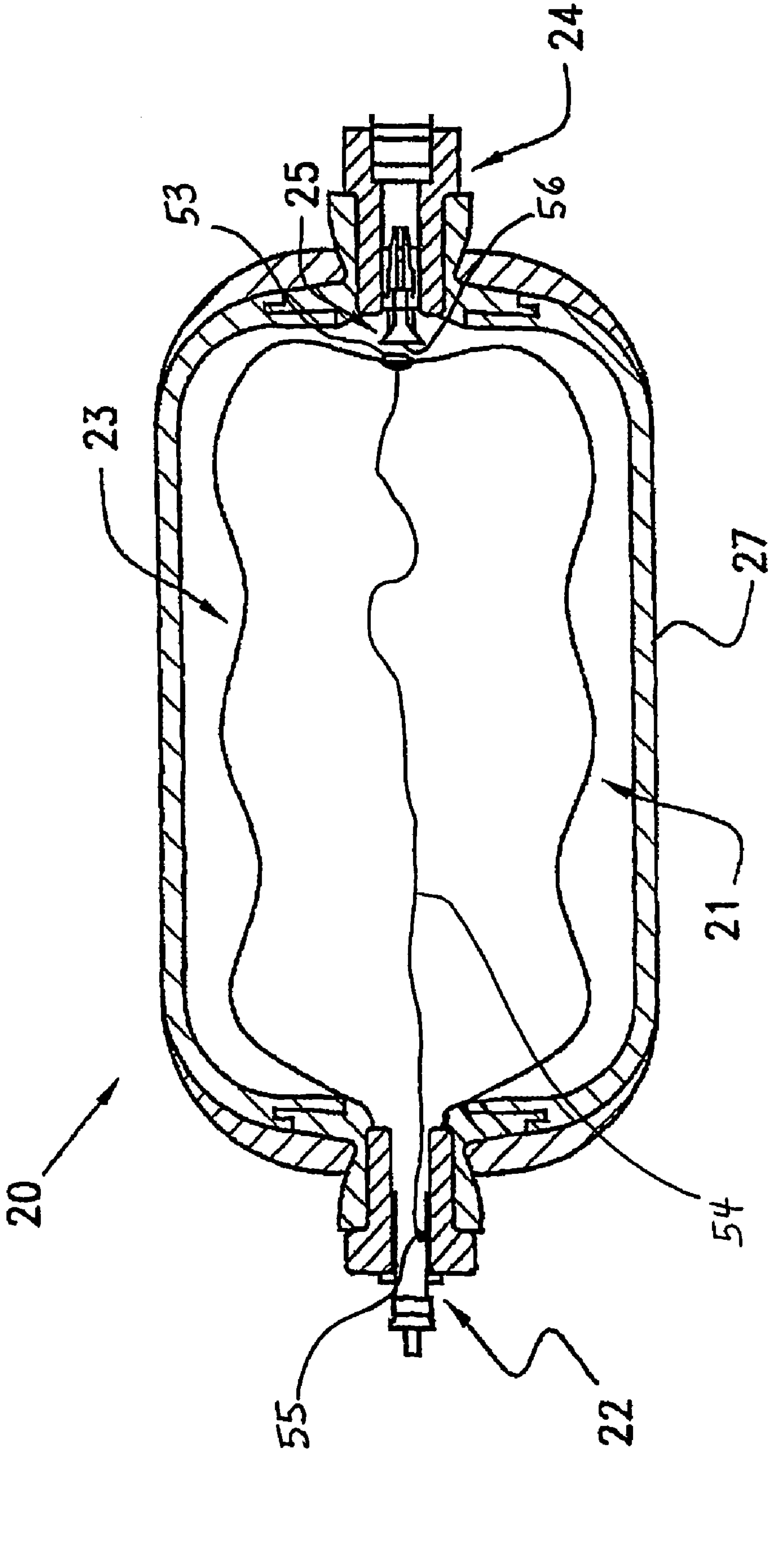
FIG. 3 shows a cross-sectional view of an accumulator according to a second embodiment of the invention with a bladder position sensor arrangement.

Finally, as shown in the accumulator embodiment of FIG. 3, a mechanism for detecting a position of the bladder within the accumulator may also be provided. In one embodiment, a metal or other electrically conductive contact element 53 extends outward from bladder 21 such that element 53 contacts an electrically conductive contact surface 56 as the bladder 21 approaches shut-off valve 25. Electrically conductive contact element 53 could be a coil spring or a metal button or disk, for example. Contact element 53 is attached to an internal wire 54 (e.g. a bungee wire, a cable, or spring, each included within the claim term "wire") within bladder 21, with the wire 54 connected at its base to a weld point 55 in fixture 22. Alternatively, a hook or eye on wire 54 could attach to a hook (not shown) screwed into fixture 22. Thus the contact of element 53 with surface 56 creates continuity that may be used to complete an electrical circuit and provide an electrical signal to a control unit (not shown) indicating the bladder 21's position within accumulator 20. In this manner, the contact element 53 helps provide a continuity contact sensor/switch to signal bladder 21's position as desired, for useful control of the accumulator's operation, for example to allow the control unit to prevent an undesired accumulator shut-off.

In a further alternative embodiment, the position sensor arrangement involving contact element 53 could be used in an accumulator using a bellows instead of a bladder, with for example a metal (or another material such as nylon) bellows such as that shown in FIGS. 4A and 4B of commonly-assigned U.S. Pat. No. 7,121,304 replacing the metal foil bladder of FIG. 1 of that patent. Optionally, the metal structure of the bellows itself could be used in place of internal wire 54 for the position sensing circuit with element 53. Adaptation and use of the position sensor arrangement within a bellows accumulator is within the ordinary skill of the art and thus further explanation here is not needed.

While particularly useful for high pressure accumulators in hydraulic hybrid motor vehicles for the reasons as discussed above, it will also be understood that the device of the present invention may be used for other purposes as well, including, for example, as a lower pressure accumulator for a wide variety of applications.

From the foregoing it will also be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A hydraulic pressure accumulator, comprising:

a rigid housing having an open interior;

a first fixture mounted in said housing for fluid communication with a gas source exterior to said housing;

a bladder, positioned within the interior of said housing and having an interior in communication with the first fixture and containing a mass of compressed gas;

a second fixture mounted in said housing for fluid communication between a liquid source exterior to said housing and a space within the housing, said space defined between the housing and the bladder, an internal electrically conductive wire located within the bladder; and an electrically conductive contact element operably connected to the internal wire and protruding from the bladder toward the second fixture and configured to contact a second electrically conductive surface as the volume of liquid within the housing approaches a predetermined low level, thereby creating a circuit from the second electrically conductive surface to the internal wire and signaling the position of the bladder within the accumulator.

2. The accumulator of claim 1, wherein the bladder comprises a first metal foil layer glued to the inside of a second bladder layer made of a flexible material.

* * * * *